(12) United States Patent
Zong et al.

(10) Patent No.: US 11,171,557 B2
(45) Date of Patent: Nov. 9, 2021

(54) POWER CONVERTER

(71) Applicant: ABB Schweiz AG, Baden (CH)

(72) Inventors: Sheng Zong, Beijing (CN); Guoxing Fan, Beijing (CN); Kai Tian, Xingtai (CN); Mei Liang, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/025,126

(22) Filed: Sep. 18, 2020

(65) Prior Publication Data
US 2021/0006149 A1 Jan. 7, 2021

Related U.S. Application Data

(63) Continuation of application No. PCT/CN2018/106654, filed on Sep. 20, 2018.

(51) Int. Cl.
*H02M 7/5387* (2007.01)
*H02M 1/12* (2006.01)
(Continued)

(52) U.S. Cl.
CPC .......... *H02M 1/126* (2013.01); *H02M 1/083* (2013.01); *H02M 7/483* (2013.01); *H02M 7/53871* (2013.01)

(58) Field of Classification Search
CPC ...... H02M 1/126; H02M 1/083; H02M 7/483; H02M 7/53871
See application file for complete search history.

(56) References Cited

U.S. PATENT DOCUMENTS 7,215,560 B2 * 5/2007 Soldano .............. H02M 1/4225
363/44
9,093,917 B2 * 7/2015 Ho ...................... H02M 1/4208
(Continued)

FOREIGN PATENT DOCUMENTS

CN 101022252 A 8/2007
CN 202127250 U 1/2012
(Continued)

OTHER PUBLICATIONS

Intellectual Property Office of the P.R. China, International Search Report & Written Opinion issued in corresponding Application No. PCT/CN2018/106654, dated Apr. 28, 2019, 11 pp.

*Primary Examiner* — Gary L Laxton
(74) *Attorney, Agent, or Firm* — Greenberg Traurig, LLP

(57) ABSTRACT

A power converter includes a full-bridge conversion circuit. The full-bridge conversion circuit includes a first leg and a second leg. The first leg includes at least two switches coupled to each other at a first node, and the second leg includes at least two switches coupled to each other at a second node. The power converter further includes an AC filter. The AC filter includes a first inductor, a second inductor and a capacitor. The first inductor includes a first end coupled to the first node and a second end could be couple to a grid. The second inductor includes a first end coupled to the second node and a second end could be couple to the grid. The capacitor includes a first end coupled to the second end of the first inductor and a second end coupled to the second leg. The first end of the capacitor is electrically coupled to the second end of the first inductor during a cycle of an AC voltage of the grid.

9 Claims, 8 Drawing Sheets

(51) Int. Cl.
*H02M 1/08* (2006.01)
*H02M 7/483* (2007.01)

(56) References Cited

U.S. PATENT DOCUMENTS

| | | | | |
|---|---|---|---|---|
| 2013/0016545 A1* | 1/2013 | Xu | ............................ | H02M 1/44 |
| | | | | 363/126 |
| 2015/0092452 A1* | 4/2015 | Hatakeyama | ............ | H02M 3/24 |
| | | | | 363/17 |

FOREIGN PATENT DOCUMENTS

| CN | 202889183 U | 4/2013 |
|---|---|---|
| CN | 103944428 A | 7/2014 |
| CN | 104037769 A | 9/2014 |
| CN | 106559006 A | 4/2017 |
| CN | 207652748 U | 7/2018 |
| EP | 2882083 A1 | 6/2015 |
| EP | 2882090 A1 | 6/2015 |

\* cited by examiner

POWER CONVERTER

FIELD

Embodiments of the present disclosure generally relate to the field of electrical power, and in particular, to power converter.

BACKGROUND

Non-isolated full-bridge is one of the most popular topologies in the power factor correction (PFC) and grid-connected converter application. Generally an L or LCL filter is employed to suppress the high frequency differential mode ripple current injected to the AC grid. LCL filter has a much better filter performance than the L filter with the same inductance. However, LCL filter requires more inductors, which results in higher cost and a larger size.

A unipolar switching scheme can be applied in the non-isolated full-bridge topology. However, the unipolar switching scheme will introduce a high-frequency common mode voltage to the AC grid. The common mode (CM) voltage generates a high frequency leakage current at the ground terminal in a grid network, which can trigger circuit breakers to shut down the entire network. In photovoltaic (PV) and motor drive applications, the CM leakage current is relatively high due to the considerable CM stray capacitance, which can reduce the life time of the power converter and even damage the PV panels or bearings of motors.

EP2882090A1 introduces a power converter including two additional filter switches to solve the above problems. However, the addition of filter switches would result in an increase in the cost and a reduction in the reliability of the power converter. Accordingly, there is a need for a continual improvement in the power converter.

SUMMARY

In general, example embodiments of the present disclosure provide a power converter.

In accordance with some embodiments, there is provided a power converter. The power converter comprises a full-bridge conversion circuit comprising a first leg comprising a first high side switch and a first low side switch coupled to each other at a first node, and a second leg comprising a second high side switch and a second low side switch coupled to each other at a second node. The power converter further comprises an AC filer, comprising: a first inductor comprising a first end coupled to the first node and a second end coupleable to a grid, a second inductor comprising a first end coupled to the second node and a second end coupleable to the grid, and a capacitor comprising a first end coupled to the second end of the first inductor and a second end coupled to the second leg. The first end of the capacitor is electrically coupled to the second end of the first inductor during a cycle of an AC voltage of the grid.

According to embodiments of the present disclosure, an LCL filter is formed without additional inductors, which reduces the cost of the power converter. The capacitor is configured in parallel with the stray capacitance, and thus high frequency CM leakage current can be reduced. In the meantime, no additional switches are connected or coupled between the capacitor and the inductor, resulting in a reduction in the cost and an improvement in the reliability of the power converter.

In some embodiments, the second high side switch and the second low side switch are configured to be turned off during a time window around a zero crossing of the AC voltage, and the first high side switch and/or the first low side switch is turned on and off at a first frequency during the time window, the first frequency being higher than the line frequency. In this way, the current spike on the grid current at the zero crossing of the AC voltage can be substantially suppressed.

In some embodiments, the first high side switch and the first low side switch are configured to be turned on and off at a second frequency during a first period in a positive half cycle of the AC voltage outside the time window and a second period in a negative half cycle of the AC voltage outside the time window, the second frequency being higher than the line frequency.

In some embodiments, one of the second high side switch and the second low side switch is configured to be turned on during the first period and turned off during the second period, and the other of the second high side switch and the second low side switch is configured to be turned off during the first period and turned on during the second period. In this way, a unipolar switching scheme is used instead of a bipolar switching scheme and the cost of the power switches and thus the power converter can be substantially reduced.

In some embodiments, the first high side switch and the first low side switch are configured to operate at a frequency higher than a line frequency, and the second high side switch and the second low side switch are configured to operate at the line frequency. By operating the second high side switch and the second low side switch at the line frequency, the cost of the power converter can be reduced and the reliability of the power converter can be improved.

In some embodiments, the second end of the capacitor is coupled to the second node.

In some embodiments, the second leg is coupled between a DC positive terminal and a DC negative terminal, and wherein the second end of the capacitor is coupled to the DC negative terminal or the DC positive terminal.

In some embodiments, each of the first high side switch and the first low side switch comprises a Metal Oxide Semiconductor Field Effect Transistor (MOSFET), and each of the second high side switch and the second low side switch comprises an Insulated Gate Bipolar Transistor (IGBT). MOSFET can be switched at a high frequency and IGBT can be switched at a relatively low frequency. In this way, the first leg and the second leg are provided with respective switches suitable for their respective requirements.

In embodiments, each of the first high side switch, the first low side switch, the second high side switch, and the second low side switch comprises a Metal Oxide Semiconductor Field Effect Transistor (MOSFET).

In some embodiments, at least one of the first and second legs comprises an interleaved topology or a multilevel topology.

It is to be understood that the Summary is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, in which.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
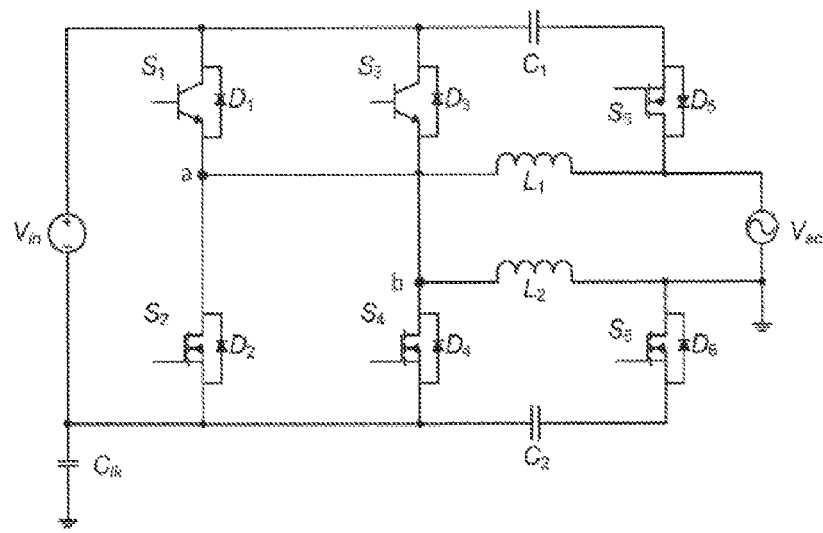
FIG. 1 shows a power converter in accordance with the prior art.
Figure 5:
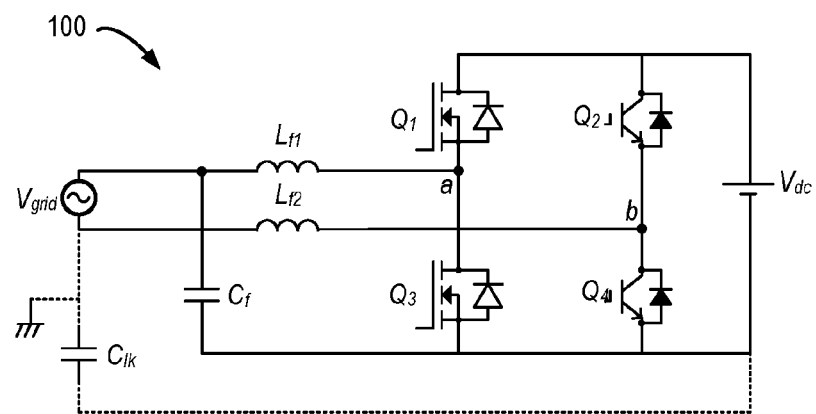
FIG. 5 shows a power converter in accordance with embodiments of the present disclosure.

FIG. 1 shows a schematic diagram of a power converter in accordance with the prior art, which is a reproduction of FIG. 5 in EP2882090A1. The AC filter $L_1$, $L_2$ can be reconfigured to AC filters $L_1$, $C_1$, $L_2$ or $L_1$, $C_2$, $L_2$ without adding an additional inductor. The power converter can save cost by means of reducing the inductance value of filter inductor. The high frequency common mode (CM) leakage current via the CM stray capacitor $C_{lk}$ can be suppressed, and a unipolar switching scheme can be used in the power converter.

However, the power converter includes additional bidirectional switches that have to be switched as the polarity changes of the AC grid voltage. Such configuration and operation would increase the cost of the power converter and reduce reliability of the power converter. Accordingly, there is a need for an improved power converter.

Figure 2:
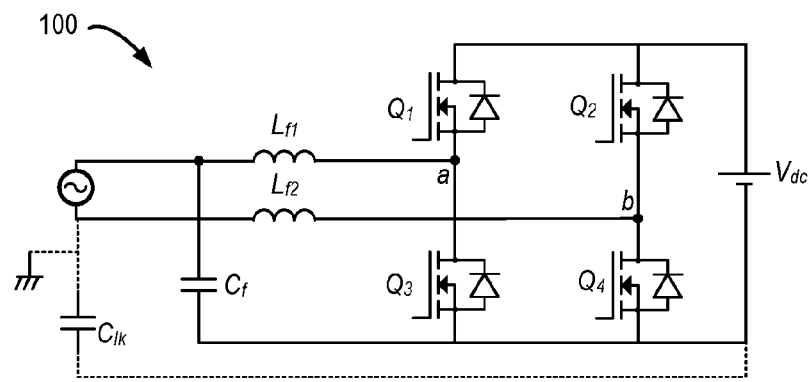
FIG. 2 shows a power converter in accordance with embodiments of the present disclosure.

FIG. 2 illustrates a schematic diagram of a power converter 100 in accordance with embodiments of the present disclosure. The power converter 100 is, for example, a full-bridge single phase power converter including a full-bridge conversion circuit. The power converter 100 may be an inverter, for example. The full-bridge conversion circuit includes a first leg having a high side switch $Q_1$ and a low side switch $Q_3$ coupled to the high side switch $Q_1$ at a node a, and a second leg having a high side switch $Q_2$ and a low side switch $Q_4$ coupled to the high side switch $Q_2$ at a node b. The high side switches $Q_1$ and $Q_2$ are coupled to the positive terminal of the DC link $V_{dc}$, and the low side switches $Q_3$ and $Q_4$ are coupled to the negative terminal of the DC link $V_{dc}$.

The power converter 100 further includes an AC filter with a first inductor $L_{f1}$, a second inductor $L_{f2}$, and a capacitor C. A first end of the first inductor $L_{f1}$ is coupled to the node a, and a second end of the first inductor $L_{f1}$ is coupled to an AC source, for example, the grid. A first end of the second inductor $L_{f2}$ is coupled to the node b, and a second end of the second inductor $L_{f2}$ is coupled to the grid. A first end (the top plate) of the capacitor C is coupled to the second end of the inductor $L_{f1}$, and a second end (the bottom plate) of the capacitor C is coupled to the second leg, for example, to the negative terminal of the DC link $V_{dc}$.

Figure 3:
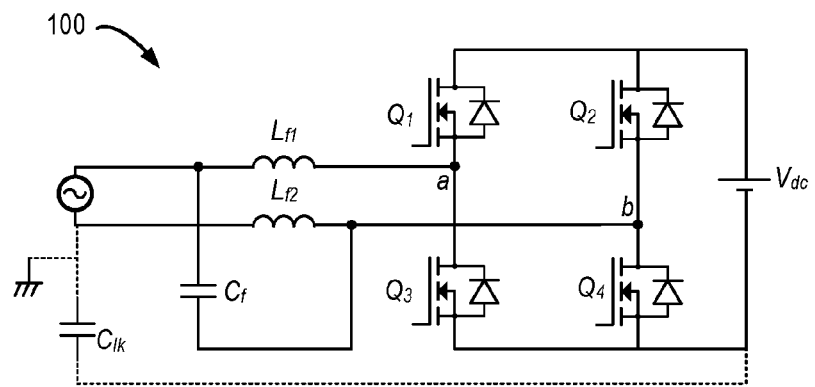
FIG. 3 shows a power converter in accordance with embodiments of the present disclosure.

FIG. 3 illustrates a circuit diagram of a power converter 100 in accordance with embodiments of the present disclosure. The difference between the power converter 100 shown in FIG. 3 and the power converter 100 shown in FIG. 2 is that the second end of the capacitor C is coupled to the node b, i.e., the first end of the inductor $L_{f2}$.

Figure 4:
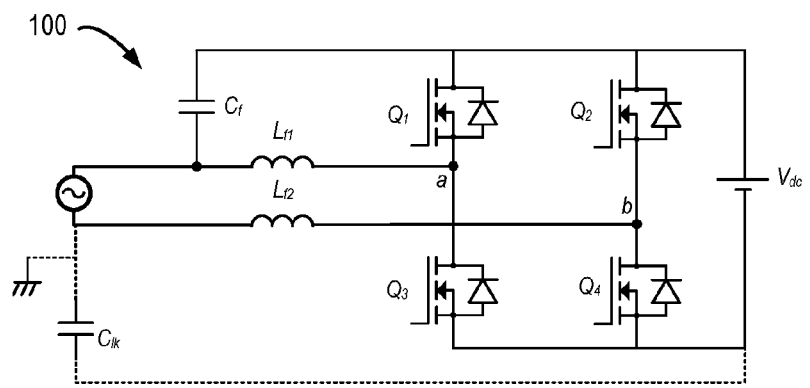
FIG. 4 shows a power converter in accordance with embodiments of the present disclosure.

FIG. 4 illustrates a circuit diagram of a power converter 100 in accordance with embodiments of the present disclosure. The difference between the power converter 100 shown in FIG. 4 and the power converter 100 shown in FIG. 2 is that the second end of the capacitor C is coupled to the positive terminal of the DC link $V_{dc}$.

Because no additional switches are connected or coupled between the capacitor C and the inductor $L_{f1}$, the first end of the capacitor is electrically coupled to the second end of the first inductor $L_{f1}$ during a cycle of the grid. The first end of the capacitor C is electrically decoupled or disconnected to the second end of the second inductor $L_{f2}$ during the cycle of the AC voltage. Compared to the power converter shown in FIG. 1, the cost of the power converter 100 can be reduced and reliability of the power converter 100 can be improved.

As shown in FIGS. 2-4, each of the switches $Q_1$-$Q_4$ is implemented by a Metal Oxide Semiconductor Field Effect Transistor (MOSFET), for example, a power MOSFET such as a Si MOSFET or SiC MOSFET. It is to be understood, however, the switches $Q_1$-$Q_4$ may be implemented by any other suitable switches, for example, Insulated Gate Bipolar Transistors (IGBTs). In addition, the power switches may be selected from a group consisting of GaN semiconductor devices, SiC semiconductor devices, Si MOSFETs and IGBTs.

FIG. 5 illustrates a circuit diagram of a power converter 100 in accordance with embodiments of the present disclosure. The difference between the power converter 100 shown in FIG. 5 and the power converter 100 shown in FIG. 2 is that the switches $Q_2$ and $Q_4$ are implemented by IGBTs.

Figure 6A:
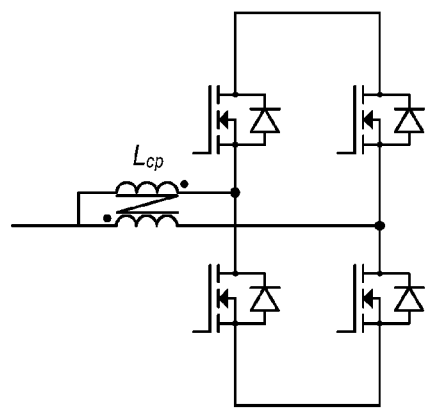
FIGS. 6(a)-(c) each illustrate a phase leg of the power converter in accordance with embodiments of the present disclosure.
Figure 6B:
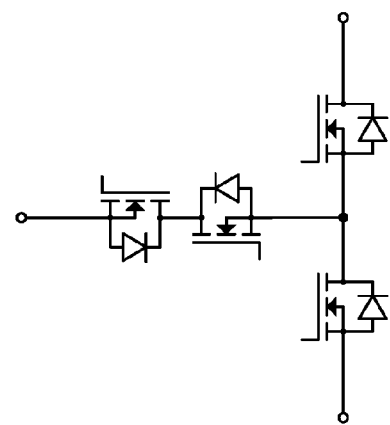
Figure 6C:
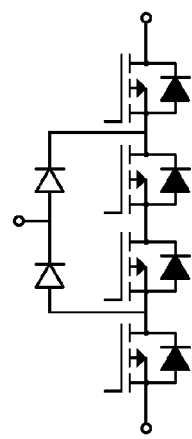

It is to be understood that the phrase leg may be implemented in any other suitable way, and the present disclosure is not limited in this regard. For example, FIGS. 6(a)-(c) illustrate alternative embodiments for the phase leg of the power converter 100 in accordance with embodiments of the present disclosure. Each leg of the power converter 100 may be implemented by the phase leg as shown in FIGS. 6(a)-(c). FIG. 6(a) illustrates a phase leg having an interleaved topology. The phase leg includes four transistors interleaved with coupled inductors $L_{cp}$. FIG. 6(b) illustrates a phase leg with an interleaved topology including two transistors interleaved with two transistors. FIG. 6(c) illustrates a phase leg with a three-level topology including four transistors and two diodes. It is to be understood that the phrase leg may be also implemented by any suitable multi-level topology.

The operation of the power converter 100 will now be described with reference to FIG. 2. It is to be understood, however, the operation described in connection with FIG. 2 is also applicable to other embodiments of the present disclosure, for example, the embodiments as shown in FIGS. 3-5 or any combination or modification thereof.

FIG. 2 illustrates a common mode stray capacitor $C_{lk}$, which is coupled in parallel with the capacitor $C_f$. The capacitance of the capacitor $C_f$ may be much greater than the stray capacitor $C_{lk}$, so that a low impedance path is formed in parallel with the stray capacitor $C_{lk}$. As a result, the leakage current can be bypassed by the capacitor $C_f$. The high frequency common mode leakage current flowing through $C_{lk}$ can be significantly reduced.

Figure 7:
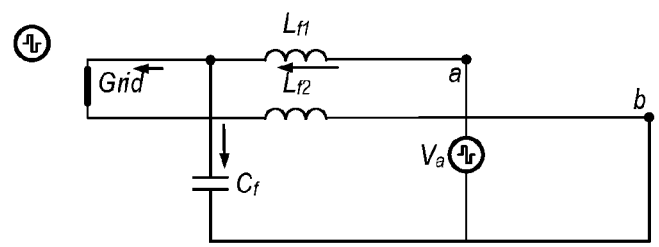
FIG. 7 shows a high frequency equivalent circuit for the power converter shown in FIG. 2.

In some embodiments, the switches $Q_1$ and $Q_3$ are configured to be operated at a first frequency, while the switches $Q_2$ and $Q_4$ are configured to be operated at a second frequency. For example, the second frequency is the line frequency, and the first frequency is greater than the line frequency, for example, a high frequency. As a result, the potential on the node a is changed at the high frequency, and the potential on the node b is stable most of the time. From the perspective of the high frequency signal, each of the line frequency source $V_{grid}$ and the direct current (DC) source $V_{dc}$ is considered as a short circuit. The high frequency equivalent circuit for the power converter 100 is shown in FIG. 7. As shown in FIG. 7, an LCL output filter is formed, and the output current of the LCL output filter is the grid current. As a result, a LCL filter is formed without additional inductors, which reduces the cost of the power converter.

Although the potential on the node b is stable most of the time, the potential on the node b changes rapidly when the switches $Q_2$ and $Q_4$ of the second leg are switched on or off. The current spike will be present on the grid current. Accordingly, it is possible for the high frequency leg to implement a switching scheme when the line frequency leg switches. The voltage across the capacitor $C_f$ is regulated to adapt or accommodate the potential change of the node b. In this way, the current spike on the grid current can be suppressed. Such switching scheme of the power converter 100 will now be described with reference to FIG. 8, which shows timing diagrams illustrating the operation of the power converter 100 shown in FIG. 2.

Figure 8:
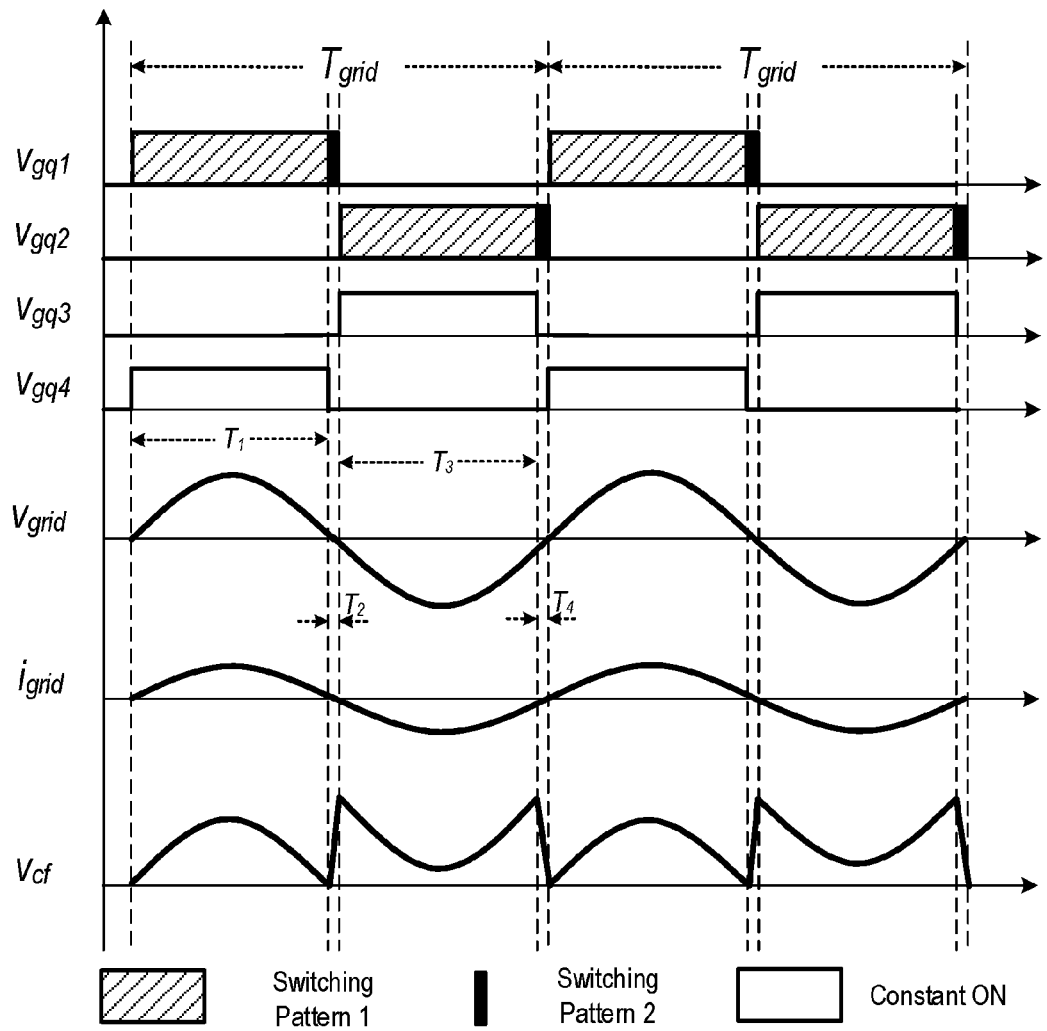
FIG. 8 shows timing diagrams illustrating the operation of the power converter shown in FIG. 2.

As shown in FIG. 8, $V_{gq1}$-$V_{gq4}$ each represent a gate voltage on the respective gate of the switches $Q_1$-$Q_4$, and $V_{grid}$, $i_{grid}$, and $V_{cf}$ represent the grid voltage, the grid current, and the voltage across the capacitor $C_f$. A cycle of the grid voltage $T_{grid}$ includes a first period $T_1$ in a positive half cycle of the AC voltage, a second period $T_2$ around a zero crossing of the AC voltage, a third period $T_3$ in a negative half cycle of the AC voltage, and a fourth period $T_4$ around another zero crossing of the AC cycle.

The totem-pole unipolar switching scheme is applied to the first leg (the high frequency switching leg) to shape the grid current to be sinusoidal. The totem-pole unipolar switching scheme is shown as Switching Pattern 1 in FIG. 8, for example, during the first and third periods $T_1$ and $T_3$. The switches $Q_2$ and $Q_4$ are operated at the line frequency during the first and third periods $T_1$ and $T_3$.

Figure 9:
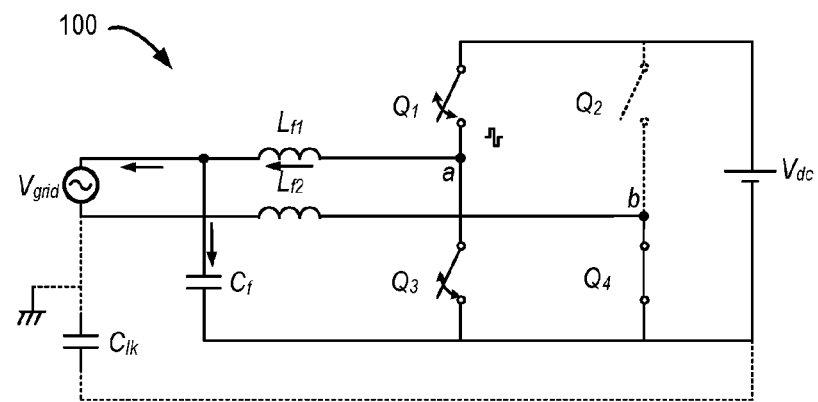
FIG. 9 shows an operating mode of the power converter shown in FIG. 2.

FIG. 9 shows an operating mode of the power converter 100 for the first period $T_1$ in the positive half cycle of the AC voltage. During the first period $T_1$, the switch $Q_2$ on the line frequency leg is turned off and the switch $Q_4$ on the line frequency leg is turned on. As a result, the potential on the node b is stable and clamped to the negative voltage of DC link.

Figure 10:
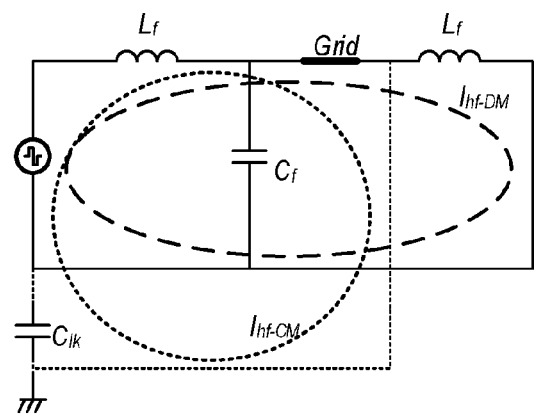
FIG. 10 shows a high frequency equivalent circuit for the operating mode shown in FIG. 9.

The switches $Q_1$ and $Q_3$ are turned on and off at the high frequency. As a result, the potential on the node a is changed at the high frequency. From the perspective of high frequency signal, the line frequency source $V_{grid}$ and the DC source $V_{dc}$ are each considered as a short circuit. FIG. 10 shows a high frequency equivalent circuit of the power converter 100 in the operation mode. The dashed circle represents the high frequency differential mode current loop, which is an LCL filter with 60 dB/dec attenuation. The dotted circle represents the high frequency common mode current loop. Again, it can be seen that the capacitor $C_f$ is connected in parallel with the stray capacitor $C_{lk}$. As a result, the leakage current can be bypassed by the capacitor $C_f$. The high frequency common mode leakage current flowing through $C_{lk}$ can be significantly reduced. The operation during the third period $T_3$ in the negative half line cycle is the same and will not be described in detail for the sake of clarity.

Referring back to FIG. 8, during the time slot when the gird voltage crosses zero (i.e., the second and fourth periods $T_2$ and $T_4$), the modulation scheme will be changed from Switching Pattern 1 to Switching Pattern 2, which may be a high frequency switching scheme. The switches $Q_2$ and $Q_4$ are operated in a different way than being turned on and off at the line frequency.

Figure 11:
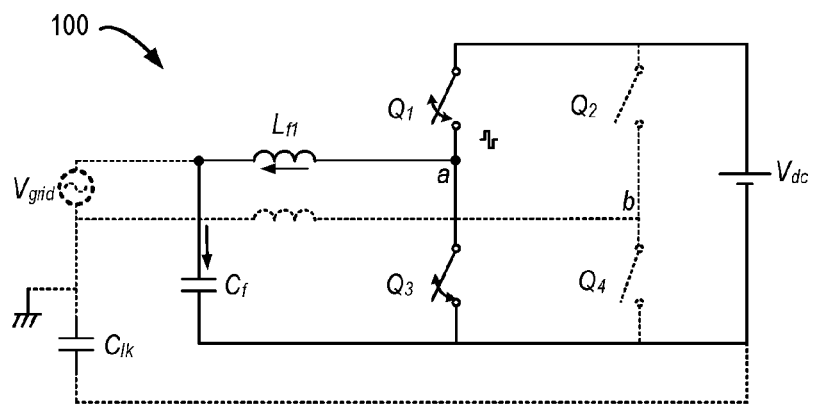
FIG. 11 shows another operating mode of the power converter shown in FIG. 2.

FIG. 11 shows an operating mode of the power converter 100 for the second or fourth period $T_2$ or $T_4$. As shown in FIGS. 8 and 11, the switches $Q_2$ and $Q_4$ are both turned off. The switches $Q_1$ and/or $Q_3$ may be turned on and off at a third frequency. The third frequency may be higher than the frequency of the AC source, i.e., the line frequency. As shown in FIG. 11, the switches $Q_1$ and $Q_3$ may be alternatively turned on and off at the third frequency. Alternatively, the switch $Q_1$ may be turned off and the current may be conducted by the diode (for example, a separate diode or a body diode of a MOSFET) in anti-parallel with the switch $Q_1$, and the switch $Q_3$ may be turned on and off at the third frequency, and vice versa.

The voltage on the node b is not stable when the line frequency leg switches. For example, when the switch $Q_4$ is turned off and the switch $Q_2$ is turned on, the potential on the node b changes from 0 to $V_{dc}$ very rapidly. The voltage across the capacitor $C_f$, however, is still about zero. The voltage difference between the node b and the capacitor $C_f$ leads to a large current spike on the grid current. Switching Pattern 2 can regulate the voltage across the capacitor $C_f$ by switching the high frequency leg. The capacitor $C_f$ is charged to $V_{dc}$ before the switch $Q_2$ is turned on by switching the high frequency leg, so that the voltage difference becomes very small and the current spike can be suppressed as well.

On the other hand, when the switch $Q_2$ is turned off and the switch $Q_4$ is turned on, the capacitor $C_f$ can be discharged to zero by switching the high frequency leg. As shown in FIG. 11, when the switches $Q_1$ and $Q_3$ may be alternatively turned on and off at the third frequency, a buck boost converter is formed to charge or discharge the capacitor $C_f$. In other cases, a buck or boost converter or switching pattern can be used to charge or discharge the capacitor $C_f$. For example, when the switch $Q_3$ is turned off and conducts current by the diode in anti-parallel with the switch $Q_3$, and the switch $Q_1$ is turned on and off at the third frequency, a buck converter will be formed to charge or discharge the capacitor Cf. When the switch $Q_1$ is turned off and the current is conducted by the diode in anti-parallel with the switch $Q_1$, and the switch $Q_3$ is turned on and off at the third frequency, a boost converter will be formed to charge or discharge the capacitor $C_f$.

Figure 12:
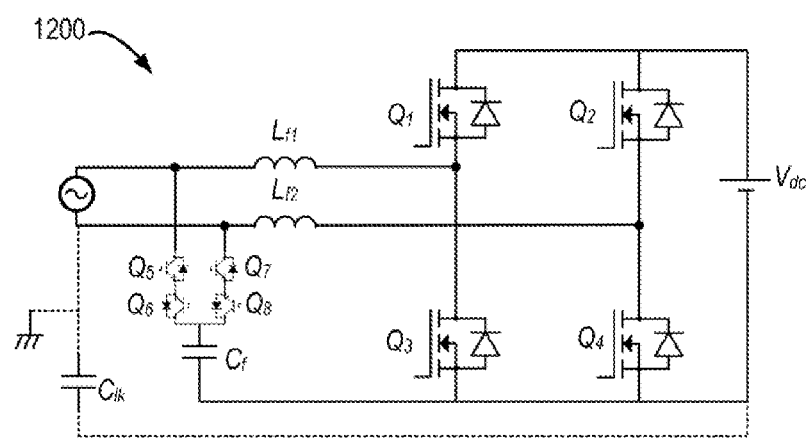
FIG. 12 shows a power converter to be compared to the power converter shown in FIG. 2.

FIG. 12 illustrates a schematic diagram of a power converter 1200 for simulation. The power converter 1200 is derived from the power converter shown in FIG. 1 to be used as a benchmark. The power converter 1200, however, not admitted to be prior art by inclusion herein.

Table 1 shows the simulation specification for the power converter 1200.

TABLE 1

| Simulation specification for the power converter 1200 | |
| --- | --- |
| Parameters | Values |
| Input voltage $V_{in}$ | 400 V |
| Grid voltage $V_o$ | 230 Vrms/50 Hz |
| Nominal Power $P_{ac}$ | 2 kW |
| Switching frequency $f_s$ | 60 kHz |
| SiC MOSFETs $Q_1$-$Q_4$ | C3M0065100K |
| Si MOSFETs $Q_5$-$Q_8$ | IPP60R060P7 |
| Filter capacitor $C_f$ | 1.2 uF |
| Filter inductor $L_{f1}$-$L_{f2}$ | 420 uH |
| CM stray capacitor | 20 nF |

For the power converter 100 shown in FIG. 2, the simulation parameters are almost the same for comparative study, and the simulation specification is shown in Table 2. For ease of comparison, all of the power semiconductor switches are the same, although the switches $Q_2$ and $Q_4$ in the line frequency leg can be selected as IGBTs or Si MOSFETs to obtain some benefit in one aspect or another.

TABLE 2

| Simulation specification for the power converter 100 shown in FIG. 2 | |
| --- | --- |
| Parameters | Values |
| Input voltage $V_{in}$ | 400 V |
| Grid voltage $V_o$ | 230 Vrms/50 Hz |
| Nominal Power $P_{ac}$ | 2 kW |
| Switching frequency $f_s$ | 60 kHz |
| SiC MOSFETs $Q_1$-$Q_4$ | C3M0065100K |
| Filter capacitor $C_f$ | 1.2 uF |
| Filter inductor $L_{f1}$-$L_{f2}$ | 420 uH |
| CM stray capacitor | 20 nF |

The simulation results show that similar performance can be obtained by the two power converters 100 and 1200. The result is summarized in the following Table 3. In the simulation, both converters use a unipolar modulation scheme, and have an LCL filter performance without any additional grid-side inductor, and the common mode leakage current can be suppressed as well. Since the unipolar modulation scheme is used in both converters, the power losses of the converters are very similar to each other, although the modulation schemes for the converters are not the same as each other. The power loss of the power converter 100 is 31.38 W, while the power loss of the power converter 1200 is 30.77 W. The efficiencies of the power converters 100 and 1200 are 98.46% and 98.48%, respectively. The Total Harmonic Distortion (current) THDi of the grid current of the power converter 1200 is 0.4%, and the THDi of the power converter 100 is 1.37%, which is a little bit worse than the power converter 1200, but good enough to meet the requirement (<5%).

The root-mean-square (RMS) value of the common mode leakage current in the power converter 1200 is 15.1 mA, and the RMS value of the common mode leakage current in the power converter 1200 has a very similar result, i.e., 17.1 mA. As a result, the power converters 100 and 1200 have very similar performance. In terms of Bill of Material (BOM), the power converter 100 can save four power semiconductor devices, which means a remarkable reduction in cost, especially considering the related gate driver and heatsink. Additionally, the power converter 100 can have higher reliability and a smaller size.

TABLE 3

| Summary of Comparison | | |
| --- | --- | --- |
| | Power Converter 100 | Power Converter 1200 |
| THDi | 1.37% | 0.4% |
| HF CM leakage current | 17.1 mA | 15.1 mA |
| Efficiency | 98.46% | 98.48% |

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A power converter, comprising:
   a full-bridge conversion circuit comprising:
      a first let comprising a first high side switch and a first low side switch coupled to each other at a first node, and
      a second leg comprising a second high side switch and a second low side switch coupled to each other at a second node; and
   an AC filter comprising:
      a first inductor comprising a first end coupled to the first node and a second end coupleable to a grid,
      a second inductor comprising a first end coupled to the second node and a second end coupleable to the grid, and
      a capacitor comprising a first end coupled to the second end of the first inductor and a second end coupled to the second leg,
   wherein the first end of the capacitor is electrically coupled to the second end of the first inductor during a cycle of an AC voltage of the grid,
   wherein the second high side switch and the second low side switch are configured to be turned off during a time window around a zero crossing of the AC voltage, and
   wherein the first high side switch and/or the first low side switch is turned on and off at a first frequency during the time window, the first frequency being higher than a line frequency.

2. The power converter of claim 1, wherein the first high side switch and the first low side switch are configured to be turned on and off at a second frequency during a first period in a positive half cycle of the AC voltage outside the time window and a second period in a negative half cycle of the AC voltage outside the time window, the second frequency being higher than the line frequency.

3. The power converter of claim 2, wherein one of the second high side switch and the second low side switch is configured to be turned on during the first period and turned off during the second period, and the other of the second high side switch and the second low side switch is configured to be turned off during the first period and turned on during the second period.

4. The power converter of claim 1, wherein the first high side switch and the first low side switch are configured to operate at a frequency higher than a line frequency, and the second high side switch and the second low side switch are configured to operate at the line frequency.

5. The power converter of claim 1, wherein the second end of the capacitor is coupled to the second node.

6. The power converter of claim 1, wherein the second leg is coupled between a DC positive terminal and a DC negative terminal, and wherein the second end of the capacitor is coupled to the DC negative terminal or the DC positive terminal.

7. The power converter of claim 1, wherein each of the first side high switch and the first low side switch comprises a Metal Oxide Semiconductor Field Effect Transistor (MOSFET), and each of the second high side switch and the second low side switch comprises an Insulated Gate Bipolar Transistor (IGBT).

8. The power converter of claim 1, wherein each of the first high side switch, the first low side switch, the second high side switch, and the second low side switch comprises a Metal Oxide Semiconductor Field Effect Transistor (MOSFET).

9. The power converter of claim 1, wherein at least one of the first and second legs comprises an interleaved topology or a multilevel topology.

* * * * *